Figure 1:
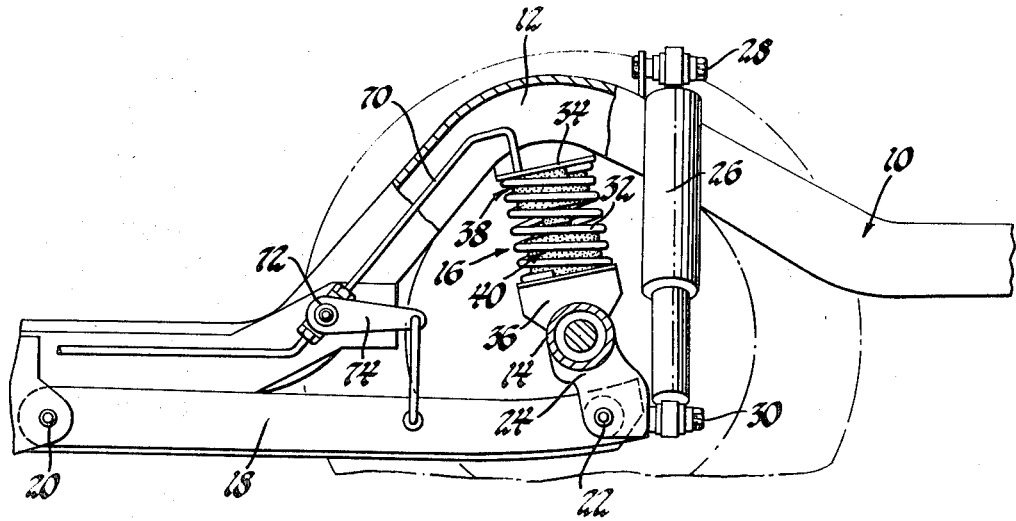

United States Patent

[11] 3,599,955

[72] Inventor Ming-chih Yew
 Sterling Heights, Mich.
[21] Appl. No. 864,600
[22] Filed Oct. 8, 1969
[45] Patented Aug. 17, 1971
[73] Assignee General Motors Corporation
 Detroit, Mich.

[54] NESTED COMPOSITE SPRING ASSEMBLY WITH MULTIPLE AUXILIARY SPRING UNITS
 4 Claims, 3 Drawing Figs.
[52] U.S. Cl. ................................................ 267/34,
 267/65, 280/124
[51] Int. Cl. ........................................... B60g 11/58
[50] Field of Search ........................................... 267/31, 34,
 35, 65; 280/124

[56] References Cited
UNITED STATES PATENTS
3,524,657 8/1970 Yew .............................. 267/34 X
3,385,589 5/1968 Erdman ........................ 267/34

*Primary Examiner*—Philip Goodman
*Attorneys*—W. E. Finken and D. L. Ellis

ABSTRACT: A vehicle suspension system in which a plurality of vacuum energized auxiliary spring bellows are nested within the confines of the primary coil suspension spring between the sprung and unsprung masses of the vehicle, each of the auxiliary spring bellows being connected in direct force transferring relation between the sprung and unsprung masses to provide a load-simulating force on the coil spring acting in parallel with the other auxiliary spring bellows to alter the static height of the sprung mass.

PATENTED AUG 17 1971  3,599,955

INVENTOR.
Ming-Chih Yew
BY
D. L. Ellis
ATTORNEY

NESTED COMPOSITE SPRING ASSEMBLY WITH MULTIPLE AUXILIARY SPRING UNITS

This invention relates to composite spring assemblies and more particularly to composite spring assemblies employing pressure differential energized auxiliary springs operative to alter the static height deflection of primary vehicle suspension springs.

In my copending application A-12,145, assigned to the assignor of the present invention, there is disclosed an improved composite spring assembly of the nested variety wherein an auxiliary pressure differential energized air spring system is contained directly within the confines of the primary coil suspension spring operative to alter the static height deflection thereof by selected application of a source of differential pressure relative to atmosphere. The disclosed composite spring assembly exhibits the important advantage of conservation of space in the vehicle underbody areas by having the auxiliary spring system nested within the coil suspension spring, but the usual severe limitation on pressure area and pressure differential forces obtainable with such a configuration is significantly ameliorated by utilizing two distinct auxiliary air spring units, one of which imposes a simulated load between the sprung and unsprung masses and the other of which adds to the leveling capacity of the first spring by likewise partaking of the pressure area available within the primary coil spring and applying an additive simulated load thereto acting in parallel with the first spring over a portion of the primary coil spring.

The present invention provides improvement in the composite spring assembly of my copending application in the arrangement of two or more such auxiliary load-simulating air spring units each of which is arranged in force-transferring relation directly between the sprung and unsprung masses of the vehicle to act in parallel therebetween with the other auxiliary spring unit. This arrangement enables multiplication of the leveling capacity of prior art composite spring assemblies employing but a single auxiliary spring by a number equaling the number of auxiliary spring units present within the assembly.

The primary object of this invention is to provide an improved composite spring assembly wherein a plurality of pressure differential energized auxiliary spring units may be nested within a primary vehicle suspension spring and operative to provide load-simulating forces thereto through direct connection between the sprung and unsprung masses of the vehicle.

Another object of the invention is to provide a composite spring assembly wherein a plurality of auxiliary pressure differential energized spring units are each located within the confines of the primary suspension spring and each of which is connected at one end in force-transferring relation with either the sprung or the unsprung vehicle mass while the other end portion thereof is connected by tension bearing means to the other of the sprung or unsprung masses.

Figure 2:
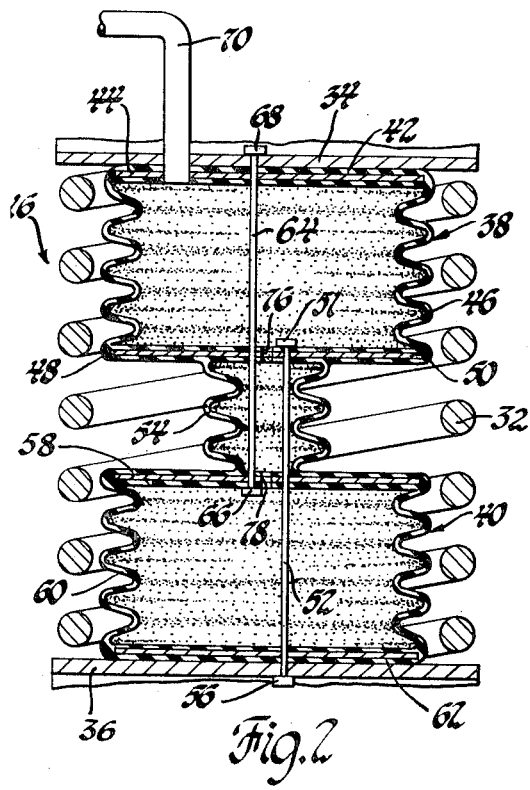

The foregoing and other objects, features and advantages of the invention will be readily apparent from the following description and from the drawings wherein:

FIG. 1 is a fragmentary side elevational view of a vehicle suspension embodying the composite spring assembly of this invention;

FIG. 2 has an enlarged sectional view of the composite spring of FIG. 1; and

Figure 3:
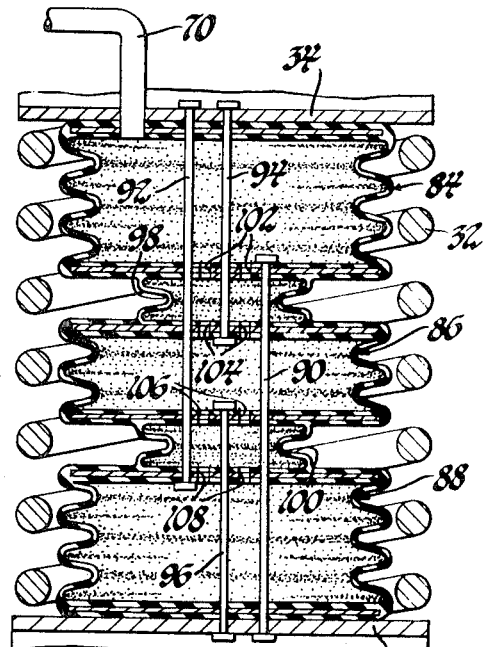

FIG. 3 is a sectional view similar to FIG. 2 showing a modified form of the composite spring.

Referring now particularly to FIG. 1 of the drawings, an automotive vehicle rear suspension arrangement is shown wherein numeral 10 generally designates one vehicle body frame side rail representing the sprung mass of the vehicle, the frame including a rear kickup portion 12. Such kickup portion accommodates reception between the body and rear axle housing 14 of the rear suspension of the sprung mass including the composite spring of this invention designated generally as 16. A trailing suspension control arm 18 has pivotal connection at 20 on a bracket attached to the side rail 10 or cross-member therefrom, while the rearward end of the trailing arm has pivotal connection at 22 with a bracket 24 suitably fixed to the axle housing 14. A shock damper or absorber strut 26 extends from pivotal mounting at 28 on side rail 10 and similar pivotal mounting at 30 on bracket 24 as is conventional.

The composite spring assembly 16 includes a primary coil suspension spring 32 arranged in compression between the frame side rail 10 and the rear axle housing 14, the latter representing the unsprung mass of the vehicle, by an upper seat 34 fixed to the side rail in well known manner and by a lower spring seat 36 fixed to the axle housing 14. Nested within coil spring 32 are a pair of auxiliary subatmospheric energized air spring bellows 38 and 40.

According to previous proposals for nested composite spring assemblies capable of altering the static height of the sprung mass and the deflection of the primary suspension spring there under by the application of engine produced subatmospheric pressure, the primary coil spring is selected of such strength as to define a "curb height"; i.e., the height at which the sprung mass rests absent its normal full load complement of passengers, which generally exhibits a tilt or higher elevation of the rear end of the body relative to the front. Such curb height distinguishes from "design height" wherein the sprung mass carries the normal load complement and at which the vehicle body is level to the ground. For conditions wherein the sprung mass rests intermediate these heights, the nested composite spring employs subatmospheric pressure to simulate a load on the sprung mass equivalent to that portion of the normal load complement absent from the sprung mass, thereby to maintain the vehicle level. Considering the limited range of pressure differential relative to atmospheric available from a subatmospheric pressure source, the added limitation on pressure area available when using the nested type of auxiliary air spring bellows or the unit may, depending upon vehicle size and load complement thereof, militate against the use of vacuum altogether and require use of the generally more expensive superatmospheric source.

According to the principal feature of the invention the two auxiliary air spring bellows 38 and 40 are nested within the coil spring 32 for conservation of space in the area of frame kickup 12, but each derives from the limited transverse area enveloped within the coil spring a pressure differential force acting additively with the pressure differential force of the other auxiliary spring, thereby to obtain significantly increased leveling capacity.

As shown best in FIG. 2, an upper air spring bellows 38 is nested within the upper portion of soil spring 32 and has its upper circular end portion 42 interposed between spring seat 34 and the upper end of the boil spring. The end portion 42 includes a generally circular reinforcing plate 44 bonded or otherwise suitably laminated within enclosing layers of the rubber or like flexible material which forms the convoluted bellows portion 46 of the air spring. At its lower end the bellows portion merges with a similar lower end portion 48 which again includes a circular reinforcing plate 50 laminated between the rubber layers. One end 51 of a tension rod 52 is suitably secured to the lower end portion 48 and extends through a flexible communicating duct 54 and slidably through the lower air spring bellows 40 to connection at its other end 56 with the lower spring seat 36 in tension-bearing relation therewith.

The duct 54 is convoluted for axial flexibility and is integrally formed at one end with the rubber layer of the lower end portion 48 and at the other end is again integrally formed with the upper rubber layer of a similar upper end portion 58 of the lower air spring bellows 40. Such upper end portion has reinforced laminated construction similar to that just described, the integrally formed bellows portion 60 of the lower air spring terminating in a laminated reinforced lower end portion 62 seated between the lower spring seat 36 and the lower end of coil spring 32. The lower air spring bellows thus has direct force-transferring connection with the unsprung mass while the upper end portion 58 has one end 66 of a tension bearing rod 64 fixed thereto, the rod extending through duct 54 to have tension bearing connection at its other end 68 with the upper spring seat on the sprung mass. The involvement between rod 52 and upper end portion 58, as well as that between the tension rod 64 and the lower end portion 48 is constructed to allow relative sliding movement between the rod and the respective distinct air spring bellows unit allowing independent expansion or contraction of the two air spring units. Similarly the collapsible duct 54 is sufficiently flexible to allow such independent operation.

The two air spring bellows 38 and 40 are communicated to an engine source of subatmospheric pressure, not shown, through a conduit 70 seen best in FIG. 1. Interposed in the conduit is a leveling valve 72 having a control lever 74 connected to suspension control arm 18. The control lever correlates the position of valve 72 relative to displacement between the sprung and unsprung masses so that vacuum is applied through conduit 70 to produce a simulated load equal to the difference between the actual load of the sprung mass and that which includes the normal load complement required to produce design height. The vacuum applied through conduit 40 is communicated directly to the volume of upper air spring bellows 38, thence through a port 76 in the lower end portion 48 thereof to the collapsible duct 52 and from there through a port 78 in the upper end portion 58 to the lower air spring bellows 40.

Assuming that the vehicle is loaded with less than the normal load complement so that the vehicle attitude is somewhere within the range between curb height and design height with corresponding static deflection of the coil spring 32, an application of vacuum through valve 72 communicates to the volume of upper air spring bellow 38. With the effective area of lower end portion 48 being exposed to atmospheric pressure, a load-simulating pressure differential force is imposed which is transferred from lower end portion 62 through tension rod 52 so that the upper air spring bellows 38 acts directly between the sprung and unsprung masses to produce an added static deflection to coil spring 32. The applied level of vacuum in conduit 40 further communicates through ports 76 and 78 to the volume within lower air spring bellows 40. A load-simulating pressure differential force is thereby created over the effective area of the upper end portion 58 which transfers through tension rod 64 to create a load simulating compression between the sprung and unsprung masses further deflecting the coil spring 32. Thus, with both air spring bellows acting in parallel in direct force transferring relation between the sprung and unsprung masses, the two pressure areas of the air spring bellows double the leveling capacity of prior nested composite spring constructions.

The principles of this invention may be carried further to incorporate additional air spring bellow pressure areas within the confines of coil spring 32 to gain even further leveling capacity from the limited transverse area within the coil spring. For example, the modified form of the invention in FIG. 3 illustrates a composite spring construction employing three auxiliary air spring bellows in parallel relation between the sprung and unsprung masses and designated generally as 84, 86 and 88. The details of construction of each of these auxiliary springs are generally identical to that in the previous embodiment, the upper end portion of upper air spring bellows 84 being interposed in the previously described manner between the upper end of coil spring 32 and the upper spring seat 34, while the lower end portion of the lower end spring bellows is similarly situated between the coil spring and the lower spring seat 36. A tension rod 90 extends between the lower end portion of upper air spring bellows 84 and the lower spring seat to transfer load-simulating forces of that air spring between the unsprung and sprung masses, while a further tension rod 92 is similarly connected between the upper end portion of the lower air spring bellows 88 and the upper spring seat connecting such air spring directly between the sprung and unsprung masses in parallel relation with the upper air spring bellows. Intermediate the upper and lower air springs, the upper end portion of the air spring bellows 86 has tension bearing connection between the upper spring seat and its upper end portion through a tension rod 94 while a further tension rod 96 connects its lower end portion with the lower spring seat. Flexible ducts 98 and 100 interconnect the three air spring bellows for communication of vacuum therebetween from conduit 70 and through a series of ports 102, 104, 106 and 108 in the juxtaposed end portions.

As is apparent the additional intermediate air spring bellows 86 further augments the leveling capacity provided by the auxiliary springs of the previous embodiment by adding thereto a third effective differential pressure area within the confines of coil spring 32 acting in parallel with the upper and lower auxiliary springs. Accordingly, the normal leveling capacity obtainable from the prior composite spring constructions employing a single nested auxiliary spring is tripled in the present embodiment by a corresponding number of effective pressure areas. It will be apparent that, depending upon the practical limitations incurred by dynamic deflection of the composite spring as well as the excursions undergone in the individual auxiliary spring units during the leveling operation, even more nested auxiliary spring units may be employed within the coil spring 32 to further add to leveling capacity.

Having thus described the invention, what I claim is:

1. In an automotive vehicle including sprung and unsprung masses, a composite spring assembly comprising, a coil primary suspension spring disposed between said sprung and unsprung masses, a first differential pressure energized auxiliary spring disposed within the confines of said coil spring having a pressure area limited substantially to the area enveloped by said coil spring transversely thereof, at least one additional differential pressure energized auxiliary spring also disposed within the confines of said coil spring having a pressure area limited substantially to the area enveloped by said coil spring transversely thereof, and means connecting one end portion of each of said auxiliary springs in direct force transferring relation with said sprung mass and the other end portion of each thereof in direct force transferring relation with said unsprung mass such that said auxiliary springs are operative in parallel relation between said masses through the entirety of said coil spring to modify the static height deflection thereof.

2. In an automotive vehicle including sprung and unsprung masses and a source of subatmospheric pressure, a composite spring assembly comprising a coil primary suspension spring compressed between end seats thereof on the sprung and unsprung masses of the vehicle, a first subatmospheric pressure energized auxiliary spring disposed within the confines of said coil spring having a pressure area limited substantially to the area enveloped by said coil spring transversely thereof, an additional subatmospheric pressure energized auxiliary spring disposed within the confines of said coil spring having a pressure area limited substantially to the area enveloped by said coil spring transversely thereof, means mounting one end portion of said first auxiliary spring on said sprung mass, means mounting one end portion of said additional auxiliary spring on said unsprung mass, and tension bearing means connecting the other end portion of said first auxiliary spring with said unsprung mass and the other end portion of said additional auxiliary spring with said sprung mass so that said auxiliary springs are operative in parallel relation directly between said masses to provide a simulated load compressing said coil spring to vary the static height deflection thereof.

3. In an automotive vehicle including sprung and unsprung masses and a source of subatmospheric pressure, a composite spring assembly comprising a first subatmospheric pressure energized auxiliary spring bellows mounted on one end thereof on the upper of the spring seats and disposed within the confines of an upper portion of said coil spring, said first auxiliary spring having an opposite pressure end portion exposed to atmospheric pressure and limited substantially to the area enveloped by said coil spring transversely thereof, an additional subatmospheric pressure energized auxiliary spring bellows mounted at one end to the other spring seat and disposed within the confines of a lower portion of said coil spring, said additional auxiliary spring having an opposite pressure end portion exposed to atmospheric pressure and limited substantially to the area enveloped by said coil spring transversely thereof, each of said auxiliary springs having a closed volume bounded by said pressure end portions thereof and connected with said subatmospheric pressure source, and tension-bearing rod means on each said pressure end portion of said first and said additional auxiliary springs extending through the other auxiliary spring and connected to the unsprung and the sprung masses respectively so that said auxiliary springs are operative in parallel relation between said masses to provide a simulated load compressing said coil spring to vary the static height deflection thereof.

4. The composite spring assembly of claim 3 wherein a third auxiliary spring bellows is situated within said coil spring intermediate the first and additional spring bellows within the upper and lower portions of the coil spring, with tension rod means connecting one end of said intermediate spring bellows to the sprung mass and the other end thereof to the unsprung mass.